G. MARTIEN & F. C. SMALL.
NUT LOCK.
APPLICATION FILED MAY 11, 1908.
907,071.
Patented Dec. 15, 1908.
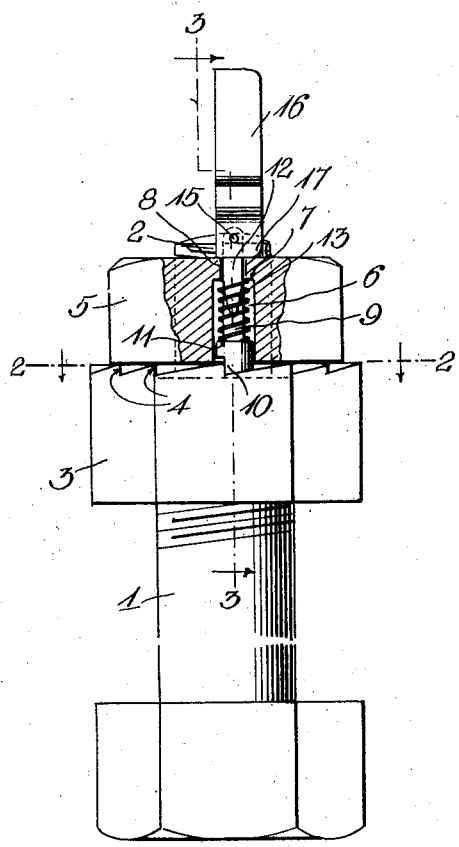
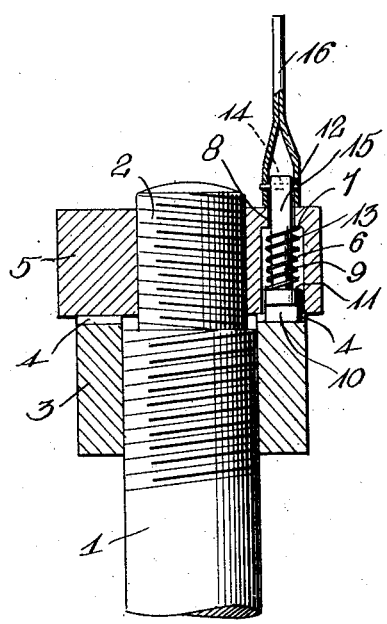
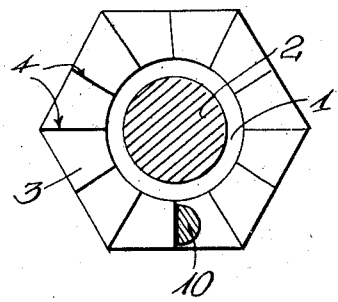
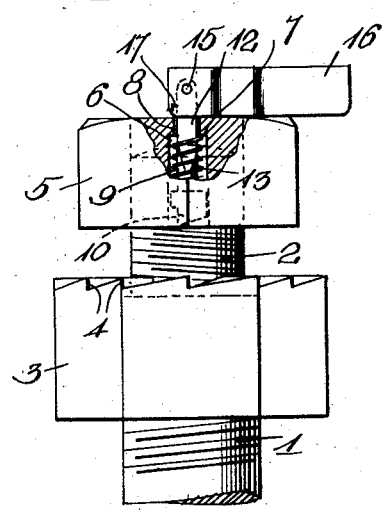
Witnesses
Inventors
Gilbert Martien
& F. Clifton Small
By
Attorneys

UNITED STATES PATENT OFFICE.

GILBERT MARTIEN AND FLOREN C. SMALL, OF MANSFIELD, OHIO.

NUT-LOCK.

No. 907,071.　　　Specification of Letters Patent.　　　Patented Dec. 15, 1908.

Application filed May 11, 1908. Serial No. 432,131.

*To all whom it may concern:*

Be it known that we, GILBERT MARTIEN and FLOREN CLIFTON SMALL, citizens of the United States, residing at Mansfield, in the county of Richland and State of Ohio, have invented certain new and useful Improvements in Nut-Locks; and we do declare the following to be a full, clear, and exact description of the invention, such as will enable others skilled in the art to which it appertains to make and use the same.

This invention relates to an improved lock nut and the object thereof is to provide a device to take the place of a jam nut and pin such as are used on fast running machinery, which will securely lock the nut against backward turning and which may be released when desired to permit the nut to be removed.

With these and other objects in view, the invention consists of certain novel features of construction, combination and arrangement of parts, as will be more fully described and particularly pointed out in the appended claim.

In the accompanying drawings, Figure 1 shows a front elevation of a bolt with this improved lock nut applied and with parts broken out; Fig. 2 is a horizontal sectional view taken on line 2—2 of Fig. 1. Fig. 3 is a vertical section on line 3—3 of Fig. 1; Fig. 4 is a front elevation partly in section of this lock nut applied and with the pawl in inoperative position and the locking member partly removed.

In the embodiment illustrated a fastening bolt 1 is shown having a right screw thread, and the outer end of this bolt is preferably reduced as shown at 2, and is provided with a left screw thread. This improved lock nut is composed of two members 3 and 5, the member 3 being in the form of the ordinary nut and having the bore thereof screw threaded to engage the right threaded larger portion of the bolt 1 and with radial ratchet teeth as 4 formed on the outer face thereof and extending from its bore to its upper edge. After the bolt has been passed through the parts to be connected and the nut 3 has been screwed on to the larger threaded portion thereof, the locking member 5 is screwed on the reduced end 2 of the bolt 1. This member 5 has a socket 6 extending longitudinally therethrough parallel with its bore and is preferably provided near its outer end with an annular shoulder forming a stop 7. The outer portion of the socket 6 beyond the stop or shoulder 7 is preferably made angular or polygonal, as shown at 8, for a purpose to be described.

A locking element in the form of a pawl or pin 9 is adapted to be mounted within the socket 6 and is preferably constructed as shown in Fig. 4, having a cylindrical head provided with a flat vertical face 10 terminating in an annular shoulder 11, with the stem 12 thereof made of a shape to fit the outer angular portion 8 of the socket 6 to adapt it to slide in said portion and prevent its turning therein and cause the flat face 10 of the pawl to be always in position for engagement with one of the ratchet teeth 4 of the member 3. A spring 13 is coiled around the shank or stem of the pawl and is adapted to bear at one end against the annular shoulder 11, and at its other end against the shoulder or stop 7 of the socket 6, and which serves to hold the pawl normally in projected position for engagement with the ratchet teeth 4 of the member 3. The outer end of this pawl 9 is preferably provided with an aperture 14 to receive a pin 15 which pivotally connects it with the operating releasing lever 16. This lever 16 may be made of any suitable or desired shape, and as shown, it is formed from a plate of sheet metal folded longitudinally upon itself and having the sides thereof bent outwardly at one end and apertured to receive the pivot pin 15. It will be readily seen that the tension of the spring 13 holds the end of this lever firmly against the outer face of the nut 5. This lever is preferably curved at one corner thereof as shown at 17 to adapt it to be readily turned when it is desired to withdraw the pawl within the socket to disengage it from the ratchet teeth of the other member.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

We claim as our invention:

A nut lock composed of two members operable in opposite directions, one of said members having radial ratchet teeth on its inner face that extend from the bore to the edge of the member, the other member having a socket extending longitudinally therethrough, the walls of the upper end of the socket being polygonal and formed with an annular shoulder, a locking element for said members mounted to slide in said socket, said element consisting of a rod, the upper end of which is polygonal to engage the polygonal portion of the socket and prevent the locking element turning and the lower end of said rod being formed with a cylindrical head for loose sliding engagement in the socket, said head being cut away to form a broad flat vertical face which engages throughout its entire width one of the ratchet teeth and is retained against rotation by the polygonal upper end so that the lower end of the locking means will be positively engaged with one of the ratchet teeth, a coil spring arranged on said locking means within said socket and bearing at one end on the head of the locking means and at its opposite end against the socket shoulder, and an operating lever for retracting the locking means from engagement with the ratchet teeth.

In testimony whereof we have hereunto set our hands in presence of subscribing witnesses.

GILBERT MARTIEN.
FLOREN C. SMALL.

Witnesses:
GEORGE BRINKERHOFF,
ARTHUR M. THORNTON,
ALEX. G. THORNTON.